3,472,635
SYNTHESIS OF CHLORINE NITRATE
Carl J. Schack, Chatsworth, Calif., assignor to North American Rockwell Corporation, a corporation of Delaware
No Drawing. Filed Dec. 29, 1966, Ser. No. 605,611
Int. Cl. C01b 21/52
U.S. Cl. 23—356                                  1 Claim

ABSTRACT OF THE DISCLOSURE

A new synthesis of chlorine nitrate by reacting ClF and $HNO_3$.

---

Chlorine nitrate, $ClNO_3$, is a compound which is used as a starting compound for the preparation of other inorganic compounds such as $AsF_3(NO_3)_2$.

In the prior art, chlorine nitrate has been prepared by the reaction of chlorine monoxide and nitrogen pentoxide. This synthesis is undesirable in that chlorine monoxide has explosive tendencies.

It is therefore an object of this invention to provide an improved process for the preparation of chlorine nitrate.

It is a further object of this invention to provide a simple process for the rapid preparation of chlorine nitrate in high yield from easily handled starting materials.

Additional objects will become apparent from the following description of the invention.

The objects of the present invention are accomplished by a process which comprises reacting chlorine monofluoride with anhydrous hydrogen nitrate. The products resulting therefrom will be hydrogen fluoride and the desired chlorine nitrate. The reaction equation is:

$$ClF + HNO_3 \rightarrow ClNO_3 + HF$$

The above reaction is fast, and occurs on contact between the reactants if at least one of the reactants is not in the solid state. The synthesis is therefore feasible above the temperature at which ClF is a solid, $-155.6°$ C. It is also feasible at higher temperatures, ambient or above. The preferred experimental means of practicing the synthesis of the instant invention is to consecutively freeze both initial reactants in a closed evacuated reactor. Upon warming, reaction ensues and may be allowed to occur for a few minutes or until the reactor reaches ambient temperature, whichever is quicker. A gas-phase flow process would be more suitable for large scale production. If desired, the reaction may be run as high as 225° C. without prohibitively affecting the yield.

Using pressure sensing means, the termination of reaction can be sensed. The reactor is then opened and the volatile contents vacuum-fractionated. If two traps are used, one at $-142°$ C. and one at $-196°$ C., the $ClNO_3$ will be substantially entirely trapped in the $-142°$ C. trap. HF may be removed from the $ClNO_3$ by either vacuum-fractionation or, preferably, by chemical complexing, for instance with KF. If an excess of either ClF or $HNO_3$ is used, the remaining ClF or $HNO_3$ can readily be separated from $ClNO_3$ by further fractionation. Yields of over 80 percent, based on starting ClF, can be expected.

It is preferred that the described synthesis take place in perhalogenated plastic or stainless steel reactors. Glass is not desirable due to its reactivity with hydrogen fluoride. No solvent, stirring, or special technique is required for the successful production of the $ClNO_3$. Due to the high reactivity of the starting materials with water, the reaction should be conducted in a closed system. Initiation of the reaction occurs upon intermolecular mingling of the reactants. The exact time of initiation of the reaction may be determined by using means known in the art to sense a pressure rise in the reactor. The reaction time may vary. However, essentially complete reaction is achieved within several minutes. The exact time of completion may be determined by using means known in the art to detect the leveling off of the pressure rise in the reactor.

The above reaction scheme may be suitably and easily converted to a flow basis. The reactants will react satisfactorily in either a liquid or gaseous state and the resultant products may be suitably separated by flow distillation. This synthesis is preferable to the solid bed method previously described when a flow system is desired. Such flow methods are especially suitable for large-scale production. Additionally, in large scale reactions, problems of heat transfer may be encountered, since this reaction is exothermic. These problems may be solved, for instance, by the inclusion of inert gas in the reaction system. The inert gas would act as a moderator.

The following examples illustrate the novel process of this invention:

EXAMPLE I

Approximately 2.32 mmoles of $HNO_3$ were frozen into a Kel-F container at $-196°$ C., followed by 2.30 mmoles of ClF. The container was closed and allowed to warm for 10 to 15 minutes to approximately 0° C. during which time the reaction was completed. It was then cooled to $-78°$ C. and opened to $-142°$ C. and $-196°$ C. traps; the volatile gases were then pumped through the traps. The $-142°$ C. trap contained 47.5 cc. of gas which infrared spectroscopy indicated to be nearly pure $ClNO_3$. This was a crude yield of 92 percent, based on the limiting reagent ClF. Further fractionation under vacuum gave 42.2 cc. of pure $ClNO_3$; a yield of 82 percent.

EXAMPLE II

In another case, 266 cc. of ClF and about 320 cc.

$HNO_3$ were frozen together at $-196°$ C. and then warmed to $-112°$ C. for approximately 30 minutes. The products were then fractionated by pumping through $-78°$ C., $-142°$ C., and $-196°$ C. traps as the reactor was allowed to warm above $-112°$ C. The $ClNO_3$ was trapped at $-142°$ C. The yield was 231 cc. or 87 percent, based on the ClF used.

EXAMPLE III

Using a 50 ml. stainless steel container approximately 538 cc. of $HNO_3$ and 506 cc. of ClF were frozen at $-196°$ C. After warming to approximately ambient temperature, the products were vacuum-fractionated. The $-142°$ trap contained 448 cc. of $ClNO_3$, an 88 percent yield, based on the ClF used.

Since it is obvious that many changes and modifications can be made in the above-described details without departing from the nature and spirit of the invention, it is to be understood that the invention is not to be limited thereto except as set forth in the appended claim.

I claim:

1. The process for producing $ClNO_3$ which comprises reacting ClF with anhydrous $HNO_3$ at a temperature from about $-112°$ C. to ambient temperature.

References Cited

UNITED STATES PATENTS 2,076,364   4/1937   Cady _____ 23—203

OSCAR R. VERTIZ, Primary Examiner
HOKE S. MILLER, Assistant Examiner

U.S. Cl. X.R.

23—153, 203